March 17, 1953     W. G. WING     2,631,455
STABLE REFERENCE APPARATUS
Filed June 29, 1946
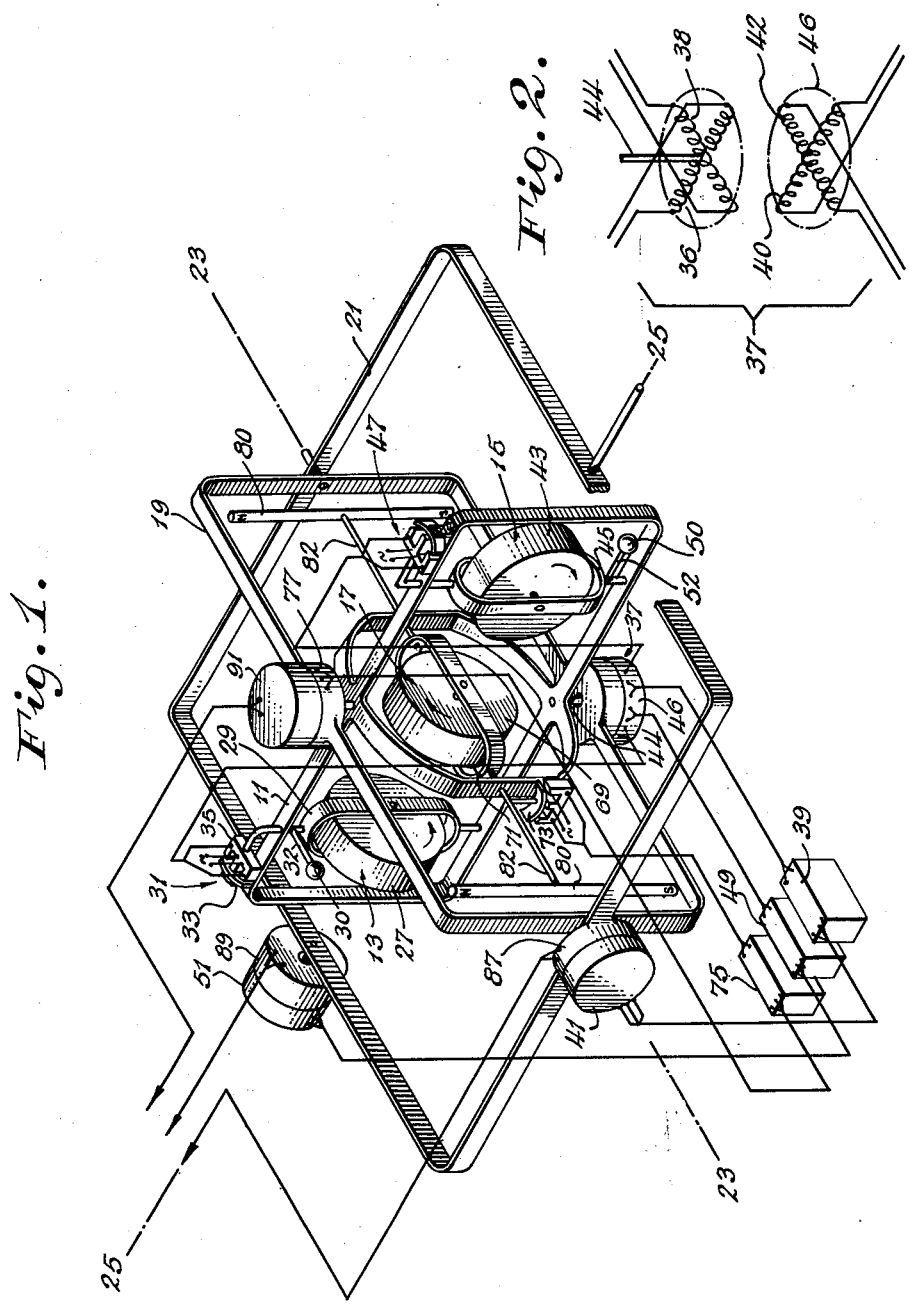
INVENTOR
WILLIS G. WING
BY
his ATTORNEY.

Patented Mar. 17, 1953

2,631,455

UNITED STATES PATENT OFFICE 2,631,455

STABLE REFERENCE APPARATUS

Willis G. Wing, Hempstead, N. Y., assignor to The Sperry Corporation, a corporation of Delaware Application June 29, 1946, Serial No. 680,353

11 Claims. (Cl. 74—5.34)

The present invention relates to stable reference apparatus, and more particularly, to apparatus employing gyroscopic stability for providing an orientation reference.

It is well known that a gyroscope embodying a universally suspended mass rotated at high speed may be employed for establishing a stable reference with respect to two perpendicular axes in space, and that two gyroscopes may be employed for establishing a universal reference about three perpendicular axes. Ordinarily, a gyroscope for a stable reference about two axes embodies a spinning rotor borne in a frame pivotally mounted in a gimbal ring, which latter is in turn pivotally mounted in a fixed support, the rotor spin axis and gimbal ring pivot axes being mutually perpendicular. Variations of orientation of the body pivotally supporting the gimbal ring ordinarily are denoted by relative movements between the gimbal ring and the rotor-bearing frame, or relative movements between the gimbal ring and the body, according to the axis about which the body turns. Sensitive pick-offs have been provided at the gimbal pivot axes for transmitting orientation data signals to control devices, e. g., to an auto-pilot or to a gun-directing apparatus, for control of such devices in accordance with the changes of orientation of the body.

Although one gyroscope is usable for orientation reference about two axes, it is subject to minute changes of orientation due to disturbing forces, in such a way that errors are introduced into the data supplied to the control devices. A gyrovertical, for example, may be employed for establishing a stable reference about first and second mutually perpendicular horizontal axes, as on an aircraft. The rotor, spinning at high velocity about a vertical axis, possesses great gyroscopic rigidity. When the craft rotates about the first horizontal axis, a very small torque is exerted upon the gyroscope about the first axis through the frictional drag of the gimbal bearings. While such a torque produces substantially no rotation of the gyroscope spin axis about the first horizontal axis, it produces a minute precessional rotation of the spin axis about the second horizontal axis. An error is accordingly introduced into the signal representing craft attitude with respect to the second horizontal axis. Similarly, rotation of the craft about the second horizontal axis induces the gyro to change its orientation about the first axis, and hence produces error in the signal representing craft attitude about the first axis.

Where very high accuracy is required, these errors cannot be tolerated. Moreover, if the sensitive pick-offs exert reactionary forces upon the gyroscope, such forces are added to the bearing frictional drag forces, magnifying the data signal errors.

In accordance with an invention by Robert F. Hays, disclosed and claimed in a U. S. Patent No. 2,591,697, issued April 8, 1952, and entitled "Stable Reference Apparatus," a movably supported frame to be stabilized about predetermined axes in space is provided with a gyroscope arranged for stabilization about each such axis. The gyroscope itself affords stiffness about the axis for which it is intended to afford stabilization, firmly resisting rotation about such axis but responding with a precessional rotation about its gimbal axis to disturbing torques which otherwise would cause a change of orientation of the frame. The precessional response is employed through amplifier and motor apparatus to counterbalance the disturbing forces about the predetermined axis. Where stabilization about three axes is desired, three gyroscopes may be pivotally mounted within the stabilization frame, and arranged to afford advantages of mutual stabilization, with freedom from gimbal error, and with extremely high rigidity in space of the movable common supporting frame for the three gyroscopes.

It is an object of the present invention to provide an improved stable reference system.

More specifically, it is an important object of the present invention to provide a gyroscopic stable reference system with improved orientation control of the gyroscope combining directness with extreme simplicity.

Another object of the present invention is to provide a gyroscopic stabilization system affording extremely high accuracy and capable of providing pick-off signals of appreciable strength without introduction of objectionable reaction error in the orientation of the gyroscopic reference system, while providing ideally simplified gyroscope orientation control.

In accordance with an important feature of the present invention, a gyroscope in the above-described system is so arranged as to respond directly to a directional force field when the movably supported frame departs from a predetermined orientation with respect to said force field, as either the earth's gravitational field or the earth's magnetic field, the action of the force field upon the gyroscope being so directed as to produce precession of the gyroscope in the direction to restore the desired orientation of the frame. Where the frame is provided with one gyroscope arranged to maintain the frame in a fixed azimuthal orientation and two further gyroscopes arranged to stabilize the frame about mutually perpendicular horizontal axes, the former gyroscope may be provided with a bar magnet arranged for responding to the earth's magnetic force field and the other gyroscopes may be arranged with their centers of gravity displaced from their normally vertical gimbal journal axes in the direction of downward peripheral movement of the rotors, for response to the earth's gravitational force field.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above objects and features will become more clearly apparent, and other objects will be recognized, from the following description of a preferred embodiment of the present invention, as illustrated in the drawing, wherein Fig. 1 illustrates a universal stabilization apparatus embodying the features of the present invention, and Fig. 2 illustrates details of an azimuthal transformation device included in the universal stabilization apparatus.

In Fig. 1 is shown a frame 11 universally suspended for freedom about three mutually perpendicular axes, and provided with three gyroscopes 13, 15 and 17 for detection of and opposition to forces tending to disturb the orientation of the principal frame 11. Frame 11 is illustrated as pivotally supported for freedom about the vertical axis in a Cardan suspension element 19. Element 19 is illustrated as pivotally supported for freedom about a first horizontal axis 23—23 in a further Cardan suspension element 21. Cardan suspension element 21, in turn, is pivotally supported, as by bearings installed in a craft, for freedom about a second normally horizontal axis 25—25, perpendicular to axis 23—23.

Gyroscopes 13 and 15 are provided for affording stabilization of frame 11 about the mutually perpendicular horizontal axes, and gyroscope 17 is arranged to stabilize frame 11 about the vertical axis. Gyroscope 13 embodies a rotor 27 supported for rotation about a horizontal axis in a rotor-bearing frame 29 which, in turn, is pivotally supported about a vertical gimbal journal axis in the principal frame 11. The rotor-bearing frame 29, while diagrammatically illustrated as an open ring, may be a rotor casing completely enclosing the rotor 27. Motive means (not shown) are provided for driving or spinning the rotor 27 in high speed rotation. For this purpose, an electric motor may be incorporated with a stator fixed to frame 29 and a rotor attached to or forming part of gyroscope rotor 27. Such well-known gyroscope constructional features are similarly applicable to gyroscopes 15 and 17.

Gyroscope 13 affords rigidity to oppose rotation about the horizontal axis perpendicular to its rotor axis. With the relative orientations of frame 11 and element 19 as illustrated in Fig. 1, gyroscope 13 affords stabilization of frame 11 merely about axis 23—23. Any forces tending to change the orientation of frame 11 about axis 23—23, e. g., bearing frictional forces transmitted through the bearings of the Cardan suspension system when the supporting body or craft revolves about the axis 23—23, are opposed by the gyroscopic rigidity resulting from high-speed rotation of the rotor 27; but such forces result in such precession of the gyroscope 13 that the rotor-bearing frame 29 commences to revolve very gradually about the vertical gimbal journal axis relative to the principal frame 11.

Sensitive pick-off apparatus schematically indicated at 31 as an E pick-off, embodying a signal transformer unit having relatively movable core portions 33 and 35 provided with a neutrally positioned primary winding and series-opposed secondary windings, on the E legs, in accordance with the teachings of U. S. Patent 1,959,804 to Wittkuhns et al., is provided for supplying an output signal of phase and magnitude denoting the direction and extent of angular displacement developed between the rotor-bearing frame 29 and the principal frame 11. The opposed secondary windings of the pick-off 31 are coupled, as through a transformation device 37 and an amplifier 39, to a suspension axis motor 41 coupled to suspension elements 19 and 21. The device 37, the amplifier 39 and the motor 41 are so connected and arranged that the motor 41 exerts a torque in the direction producing precession of gyroscope 13 to overcome the relative displacement between the parts 33 and 35 of pick-off 31, and thus to prevent prolonged exertion of any net disturbing force on the frame 11 about the axis perpendicular to the spin axis of rotor 27.

The second gyroscope 15 similarly embodies a rotor 43 supported for rotation in a rotor-bearing frame 45 which is journaled in a vertical gimbal journal axis in the principal frame 11. A second sensitive pick-off 47, which also may be of the E type, is provided for supplying an output signal upon precessional departures of the second gyroscope 15 from a predetermined orientation relative to the supporting frame 11. The second pick-off 47 is coupled through the transformation device 37 and a second amplifier 49 to a motor 51 arranged to oppose any forces tending to disturb the orientation of frame 11 about axis 25—25. It will be apparent that amplifiers 39 and 49 and motors 41 and 51 not only prevent disturbing forces from exerting prolonged effect upon the principal frame 11, but also act to retain gyroscopes 13 and 15 in their predetermined respective orientations relative to frame 11.

The transformation device 37 is a variable transformer arrangement (Fig. 2) having two primary windings 36 and 38 and two secondary windings 40 and 42. The primary windings 36 and 38, arranged for freedom from mutual coupling therebetween, may be mounted on a rotary member 44 connected to frame 11; while the secondary windings 40 and 42, similarly arranged as in quadrature positional relation for freedom from mutual coupling, are fixed to the cooperating member 46. When the frame 11 and Cardan suspension element 19 occupy the relative positions in which they are shown in Fig. 1, the primary winding 36 which is connected to pick-off 31 is closely coupled to the secondary winding 40 which is connected to the input circuit of amplifier 39; and windings 38 and 42 similarly provide maximum coupling between pick-off 47 and the input circuit of amplifier 49. But if the relative positions of frame 11 and element 19 are changed through a 90° extent, so that windings 36 and 38 are rotated 90° relative to windings 40 and 42, then the mutual coupling between windings 36 and 40 and between windings 38 and 42 is eliminated, being supplanted by maximum mutual coupling between windings 36 and 42 and between windings 38 and 40. Then pick-off 31 is coupled only to the circuit including amplifier 49 and motor 51, and pick-off 41 is coupled only to amplifier 39 and motor 41. Such an interchange of coupling relations of the pick-offs and the suspension motors is required to maintain proper coordination of the associated gyroscope axes and suspension motor axes, so that the suspension motor which responds to an angular displacement of a gyroscope about its gimbal journal axis is the motor positioned to apply the torque necessary to restore that gyroscope to its neutral position.

For intermediate changes of relative positions of frame 11 and suspension element 19, each primary winding is coupled to corresponding intermediate extents to both secondary windings 40 and 42, so that departure of a horizontal-axis stabilization gyroscope from its neutral position results in the production of appropriate torque components in both horizontal-axis motors 41 and 51.

The transformation device 37 may be especially constructed for the apparatus illustrated, or it may be produced by combining two commercially available variable transformer devices having quadrature winding relations, as for example, by tandem coupling two "Telegon" units with 90° relative displacement of their rotors, the rotor windings being employed as the primaries and the corresponding stator windings being employed as series secondaries, for example.

In accordance with an important feature of the present invention, gyroscope 13 is arranged with its center of gravity displaced from its normally vertical gimbal journal axis to the side thereof characterized by downward peripheral movement of the rotor 27. This may be accomplished, for example, by the provision of a weight 30 supported on a weight arm 32 rigidly fastened to the rotor-bearing frame 29 and extending outwardly therefrom, or the assembly, including rotor-bearing frame 29 and rotor 27, may itself be arranged with the center of gravity displaced from the gimbal journal axis in the direction corresponding to the direction of the weight arm 32. A similar arrangement, including a weight 50 and a weight arm 52, is provided on gyroscope 15. The latter weight and weight arm arrangement is shown attached at the bottom of the gyroscope 15, illustrating that it is immaterial at what height the unbalance mass be provided.

When the bearing axis interconnecting frame 11 and suspension element 19 is vertical, the gimbal journal axes of gyroscopes 13 and 15 are vertical and hence parallel with the earth's gravitational force field, and accordingly, the eccentricity of their masses exerts no torque about their gimbal journal axes. In this condition, the mass exerts a torque about an axis perpendicular to the gimbal journal axis and parallel to the rotor spin axis. Upon inclination of the frame 11 and the gimbal journal axes of the gyroscopes, however, the eccentric masses thereof produce torques about the gimbal journal axes, in the direction to produce erection of the frame 11. For slight inclination of the frame 11, the erection torque produced in this manner is substantially proportional to the angle of inclination.

The third gyroscope 17 is arranged to afford stiffness or rigidity to frame 11 about the vertical axis. This gyroscope 17 includes a rotor 69 supported for rotation about a horizontal axis in a rotor-bearing frame 71, which, in turn, is pivoted for freedom about a third gimbal journal axis in the frame 11. Gyroscope 17 is similarly provided with a precession-responsive pick-off 73 coupled through an amplifier 75 to a vertical-axis torque motor 77. In this arrangement, gyroscope 17, while rigidly opposing forces tending to rotate frame 11 about the vertical axis, responds to these forces with precession about its horizontal gimbal journal axis, and as a result, motor 77 is actuated to oppose the disturbing forces, and to restore gyroscope 17 to its neutral orientation in frame 11.

The azimuth stabilization gyroscope 17 may be retained in alignment with the horizontal component of the earth's magnetic force field by the provision of one or more vertical bar magnets 80 connected to rotor-bearing frame 71, as by extension arms 82. As arranged, these magnets produce no torque upon gyroscope 17 about the gimbal journal axis thereof when the gimbal journal axis is aligned as indicated with the horizontal component of the earth's magnetic field. Upon deviation of frame 11 about the vertical axis from this orientation, however, the magnets 80 react with the earth's magnetic field to produce a couple about the gyroscope gimbal journal axis in the direction to cause precession thereof to restore alignment with the horizontal component of the magnetic force field. Here, again, for small departures, the azimuth precessional torque exerted is substantially proportional to the angle of departure from alignment with the earth's force field. Such arrangements are broadly referred to in the art as directional gyroscopes slaved to the magnetic meridian or simply as slave gyroscopes or gyro-magnetic compasses.

Remote positional transmitter units 87, 89 and 91 may be provided for supplying craft or body orientation reference signals to utilization apparatus such as a gun fire control system or a craft attitude control system such as an aircraft auto-pilot.

With the arrangement of elements as illustrated in Fig. 1, it will be apparent that even if suspension torque motors 41, 51 and 77 were inoperative for a brief period of time, the gyroscopes 13, 15 and 17 would oppose any rapid changes of orientation of the principal reference frame 11. However, disturbing torques exerted upon frame 11 would cause precessions of the gyroscopes about their respective gimbal journal axes, and if prolonged would eventually upset the desired mutual orientation relationships among the stabilization gyroscopes. This is particularly true in instances where the transmitter units 87, 89 and 91 are required to be of such size and signal output capacity that they tend materially to interfere with the freedom of the gyroscope suspension system. With the torque motors operating, however, any disturbing torque affecting the principal frame 11 to such an extent as to cause even minute precession of one of the gyroscopes supported therein not only is opposed immediately by the gyroscopic stiffness of that gyroscope, but also is opposed by the powerful suspension torque motor coupled through an amplifier to receive the signal provided by the precession pick-off unit associated with the gyroscope. The torque motor provides its opposing torque for the duration of the disturbing force, and sufficiently longer to cause precession of the gyroscope back to its neutral position. Consequently, net effects of the disturbance both on the space orientation of frame 11 and on the relative displacement between the frame and the disturbance-opposing gyroscope are substantially cancelled.

The gyroscope orientation reference system is rendered relatively free from vulnerability to reaction torques experienced with the positional transmitters 87, 89 and 91. Moreover, the gyroscopes 13 and 15 which act to stabilize the frame 11 about the horizontal axes are arranged for freedom from error resulting from axial shifts in rotor or gimbal bearings of the center of gravity of the rotor or rotor-bearing frame.

In this stable reference apparatus, the Cardan suspension torque motors 41, 51 and 77 and their associated amplifiers 39, 49 and 75 need not meet any such exacting requirements as are ordinarily associated with servo systems requiring prompt and accurate positional follow-up action. With a readily provided torque system, the gyroscopes 13, 15 and 17 are prevented from precession farther than through an angular displacement of the order of a degree, with a prolonged rotation of the craft about any axis, and accordingly, the principal reference frame 11 may be compressed into a layout of extreme compactness. For example, the horizontal diameters of the rotors 27, 43 and 69 may be arranged in a configuration corresponding to the legs and hypotenuse, respectively, of a horizontal isosceles right triangle.

With the present invention, supervisory orientation control over a gyroscopic stable reference system in accordance with the earth's force fields is accomplished without the requirement of any relative movement of erector parts or azimuth precessor parts. The rotor-bearing frame of each gyroscope rigidly incorporates the force field-responsive element, so arranged that upon deviation of the stable reference system, a corrective torque is exerted in quadrature relation to the direction of movement required for restoration to the desired orientation, and is correctly aligned for causing such precession of the appropriate gyroscope as required for directly overcoming the deviation.

Throughout the drawing, the electrical circuit connections have been schematically indicated as extending directly between the electrically interconnected parts of the apparatus. In practice, however, slip rings and brushes are provided at the journals of intermediate suspension elements, and the conductors are arranged in cable sections extending around the Cardan suspension elements between successive journals. Such details of circuit arrangements are well-known, as are also the provisions of pneumatic or fluid drive and fluid torque systems which may be employed if desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Stable reference apparatus comprising: a movable principal frame to be stabilized about a vertical axis; a gyroscope for detecting and resisting forces tending to disturb the orientation of said principal frame about said vertical axis; said gyroscope comprising a rotor-bearing frame journaled in said principal frame for freedom about a gimbal journal axis transverse said vertical axis, and a rotor supported therein for rotation about a rotor spin axis transverse said gimbal journal axis and normally transverse said vertical axis; and means fixed to said rotor-bearing frame for providing a magnetic field aligned transverse said gimbal journal axis and fixedly in the plane of rotation of said rotor for interaction with the earth's magnetic field to exert a torque on said gyroscope about said gimbal journal axis for effecting precession of said gyroscope about said vertical axis, whereby variations of the azimuth orientation of said principal frame from alignment with the earth's magnetic field are suppressed by said precession.

2. Stable reference apparatus as defined in claim 1, said principal frame being pivotally supported for freedom about a normally vertical major axis, and said apparatus further including gyroscope means for retaining said major axis vertical.

3. Stable reference apparatus comprising: a principal frame to be stabilized in space about first and second mutually perpendicular major axes and for the establishment of a third major axis perpendicular to said first and second major axes; a first gyroscope coupled to said frame for detecting and resisting forces tending to disturb the space orientation of said principal frame about said first major axis, said first gyroscope comprising a first rotor-bearing frame journaled in said principal frame for rotation about a first gimbal journal axis perpendicular to a line extending parallel to said first major axis, and a first rotor supported in said first rotor-bearing frame for rotation therein about an axis perpendicular to a line extending parallel to said first gimbal journal axis and normally perpendicular to a line extending parallel to said first major axis; a second gyroscope coupled to said frame for detecting and resisting forces tending to disturb the space orientation of said principal frame about said second major axis, said second gyroscope comprising a second rotor-bearing frame journaled in said principal frame for rotation about a second gimbal journal axis perpendicular to a line extending parallel to said second major axis, and a second rotor supported in said second rotor-bearing frame for rotation therein about an axis perpendicular to a line extending parallel to said second gimbal journal axis and normally perpendicular to a line extending parallel to said second major axis; and means responsive to deviation of said principal frame about said first major axis from a predetermined orientation about said first major axis for applying a torque to said first rotor-bearing frame about said first gimbal journal axis to produce precession of said first gyroscope suppressing said deviation, said last-named means comprising means providing an eccentric position of the center of gravity of said first gyroscope from said first gimbal axis.

4. Stable reference apparatus comprising: a principal frame to be stabilized in space about first and second mutually perpendicular major axes and for the establishment of a third major axis perpendicular to said first and second major axes; a first gyroscope coupled to said frame for detecting and resisting forces tending to disturb the space orientation of said principal frame about said first major axis, said first gyroscope comprising a first rotor-bearing frame journaled in said principal frame for rotation therein about a first gimbal journal axis perpendicular to a line extending parallel to said first major axis, and a first rotor supported in said first rotor-bearing frame for rotation therein about an axis perpendicular to a line extending parallel to said first gimbal journal axis and normally perpendicular to a line extending parallel to said first major axis; and a second gyroscope coupled to said frame for detecting and resisting forces tending to disturb the space orientation of said principal frame about said second major axis, said second gyroscope comprising a second rotor-bearing frame journaled in said principal frame for rotation therein about a second gimbal journal axis perpendicular to a line extending parallel to said second major axis, and a second rotor supported in said second rotor-bearing frame for rotation therein about an axis perpendicular to a line extending parallel to said second gimbal journal axis and normally perpendicular to a line extending parallel to said second major axis; said second gimbal journal axis being normally vertical and said second rotor axis being normally horizontal, and the center of gravity of said second gyroscope being displaced from the plane passing through said second gimbal journal axis parallel to said second rotor axis in the direction of downward peripheral movement of said second rotor.

5. Stable reference apparatus comprising: a principal frame to be stabilized in space about first and second mutually perpendicular major axes and for the establishment of a third major axis perpendicular to said first and second major axes; a first gyroscope coupled to said frame for detecting and resisting forces tending to disturb the space orientation of said principal frame about said first major axis, said first gyroscope comprising a first rotor-bearing frame journaled in said principal frame for rotation about a first gimbal journal axis perpendicular to a line extending parallel to said first major axis, and a first rotor supported in said first rotor-bearing frame for rotation therein about an axis perpendicular to a line extending parallel to said first gimbal journal axis and normally perpendicular to a line extending parallel to said major axis; and a second gyroscope coupled to said frame for detecting and resisting forces tending to disturb the space orientation of said principal frame and about said second major axis, said second gyroscope comprising a second rotor-bearing frame journaled in said principal frame for rotation about a second gimbal journal axis perpendicular to a line extending parallel to said second major axis, and a second rotor supported in said second rotor-bearing frame for rotation therein about an axis perpendicular to a line extending parallel to said second gimbal journal axis and normally perpendicular to a line extending parallel to said second major axis; said first and second gimbal journal axes being normally vertical and said first and second rotor axes being normally horizontal, and the center of gravity of each of said gyroscopes being displaced from the plane passing through the respective gimbal journal axis parallel to the respective rotor axis in the direction of downward peripheral movement of the respective rotor.

6. Stable reference apparatus comprising: a principal frame to be stabilized in space about first and second horizontal major axes and a vertical axis: first and second gyroscopes coupled to said frame for detecting and resisting forces tending to disturb the space orientation of said principal frame about said first and second horizontal major axes, respectively, said first and second gyroscopes respectively comprising first and second rotor-bearing frames journalled in said principal frame for freedom about vertical gimbal journal axes therein and first and second rotors respectively supported in said rotor-bearing frames for rotation therein about first and second horizontal spin axes respectively perpendicular to said first and second horizontal major axes; a third gyroscope coupled to said frame for detecting and resisting forces tending to disturb the orientation of said principal frame about said vertical axis, said third gyroscope comprising a third rotor-bearing frame journalled in said principal frame for freedom about a horizontal gimbal journal axis, and a third rotor borne in said third rotor-bearing frame for rotation about a horizontal axis transverse said horizontal gimbal journal axis; said first and second gyroscopes having their centers of gravity displaced from planes through their respective gimbal journal axes parallel to their rotor spin axes in the respective directions of downward peripheral movement of the rotors.

7. Stable reference apparatus as defined in claim 6, further including means coupled to said third rotor-bearing frame for producing a unidirectional magnetic field in predetermined directional relation therewith for reacting with an ambient magnetic field, whereby the direction of said principal frame is controlled according to said ambient magnetic field.

8. A gyro-magnetic compass comprising: a vertical ring, a gyro rotor bearing frame journalled therein about a normally horizontal axis and a magnet fixed to the said frame in a normally substantially vertical position, said magnet cooperating with the earth's magnetic field to apply a torque round said axis depending on deviation of the gyro from the magnetic meridian so as to cause the gyro to precess in a direction to eliminate said deviation.

9. A gyro-magnetic compass comprising: a principal frame rotatably mounted about a normally vertical axis, a rotor having its plane of spin normally in the earth's magnetic meridian and a rotor bearing frame journalled in said principal frame about a normally horizontal axis, said frames and rotor constituting a free gyro, and a magnet fixed to said rotor bearing frame with its axis substantially vertical so that the earth's magnetic field causes said magnet to exert a torque round the rotor bearing frame axis depending on the deviation of the gyro from its normal orientation and causing the gyro to precess about said vertical axis in a direction to eliminate said deviation.

10. Stable reference apparatus for use in airplanes or other movable craft comprising: a principal frame journalled on the craft for freedom in azimuth; a gyroscope in said frame for detecting and resisting forces tending to disturb the orientation of said principal frame in azimuth; said gyroscope comprising a rotor frame journalled in said principal frame for freedom about a gimbal axis which is normally horizontal, and a rotor journalled in said rotor frame for spinning therein about a normally horizontal axis transverse to said gimbal axis;

a bar magnet fixed to said rotor frame with its polar axis perpendicular to the gimbal axis, the field of said magnet reacting with the earth's magnetic field upon deviation of said gimbal axis from the magnetic meridian to exert a direct torque on said rotor frame to produce precession of said gyroscope in a direction to restore the gimbal axis to the meridian.

11. Stable reference apparatus as claimed in claim 10, in which said bar magnet is normally vertical and is assisted by a second bar magnet spaced therefrom but similarly disposed.

WILLIS G. WING.

REFERENCES CITED

The following references are of record in the file of this patent:

UNITED STATES PATENTS

| Number | Name | Date |
|---|---|---|
| 1,545,479 | Boykow | July 14, 1925 |
| 1,801,947 | Boykow | Apr. 21, 1931 |
| 2,188,606 | Koster | Jan. 30, 1940 |
| 2,328,744 | Roters | Sept. 7, 1943 |
| 2,367,667 | Carter | Jan. 23, 1945 |
| 2,380,932 | Bates | Aug. 7, 1945 |
| 2,439,418 | Davenport | Apr. 13, 1948 |
| 2,445,384 | Bousky | July 20, 1948 |
| 2,468,554 | Hull | Apr. 26, 1949 |

FOREIGN PATENTS

| Number | Country | Date |
|---|---|---|
| 837,639 | France | Nov. 18, 1938 |